US007159670B2

(12) United States Patent
Rafeld

(10) Patent No.: US 7,159,670 B2
(45) Date of Patent: Jan. 9, 2007

(54) HORSESHOE-LIKE HOOF PAD LINING

(75) Inventor: Karl Rafeld, Fronschwenden (DE)

(73) Assignee: CERA Handesllschaft mbH, Kaufbeuren (DE)

( * ) Notice: Subject to any disclaimer, the term of this patent is extended or adjusted under 35 U.S.C. 154(b) by 0 days.

(21) Appl. No.: 10/730,700

(22) Filed: Dec. 8, 2003

(65) Prior Publication Data

US 2004/0112612 A1    Jun. 17, 2004

(30) Foreign Application Priority Data

Dec. 12, 2002    (DE)    ............................ 202 19 286 U

(51) Int. Cl.
    *A01L 7/02*    (2006.01)
(52) U.S. Cl. ........................................................ 168/12
(58) Field of Classification Search ............ 168/12–14, 168/16
    See application file for complete search history.

(56) References Cited

U.S. PATENT DOCUMENTS

| | | | | |
|---|---|---|---|---|
| 3,952,807 | A * | 4/1976 | Cattaneo | 168/28 |
| 4,557,334 | A * | 12/1985 | Cattaneo | 168/12 |
| 4,997,045 | A * | 3/1991 | Cattaneo | 168/12 |
| 6,244,352 | B1 * | 6/2001 | Luber | 168/12 |
| 6,401,828 | B1 * | 6/2002 | Rafeld | 168/12 |

FOREIGN PATENT DOCUMENTS

| | | | |
|---|---|---|---|
| DE | 36 44 706 A1 | 7/1988 | |
| DE | 10007645 A1 * | 8/2001 | |
| EP | 280656 A1 * | 8/1988 | |
| EP | 299214 A1 * | 1/1989 | |

* cited by examiner

*Primary Examiner*—Son T. Nguyen
(74) *Attorney, Agent, or Firm*—Gifford, Krass, Groh, Sprinkle, Anderson & Citkowski, P.C.

(57) ABSTRACT

Horseshoe-like hoof pad lining configuered as an essentially flat plate comprised of flexible plastic material which can be placed within the space defined by the hoof plate between the hoof plate and the hoof sole in order to avoid adhesion of especially snow and ice on the hoof sole, wherein the hoof pad lining is provided with a tube-like hump defining at least partly the enclosed space, which hump comprises a hollow space at least partly filled with air, wherein moreover the hump stands upright on the plastic material plate and extends internally up to the upper end of the hoof pad.

Figure 1:
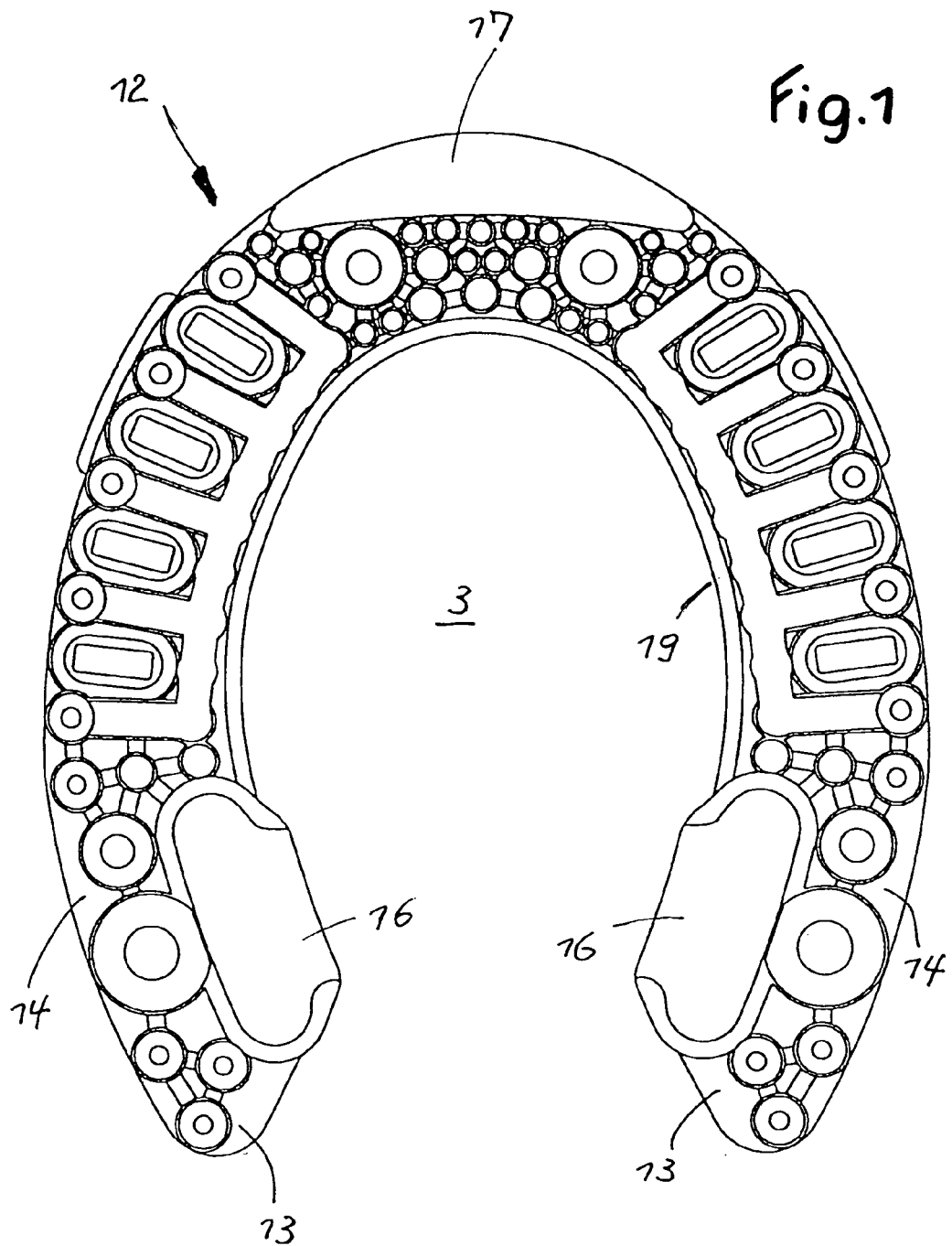

In order to improve function and lifetime as well as the elastic characteristics of the hump it comprises a tube-like hollow space profile provided with at least one oval hollow space and extended to a bridge-like connecting bar connecting the two legs of the hoof pad within the area of their ends and being provided at the front end of the hoof pad in the area of the connecting point of the two legs with an interruption, wherein the plastic material plate between the hoof pad the hoof follows the circumference of the hoof pad and is free of the hump beyond the connecting bar in the direction to the ends of the legs.

13 Claims, 4 Drawing Sheets

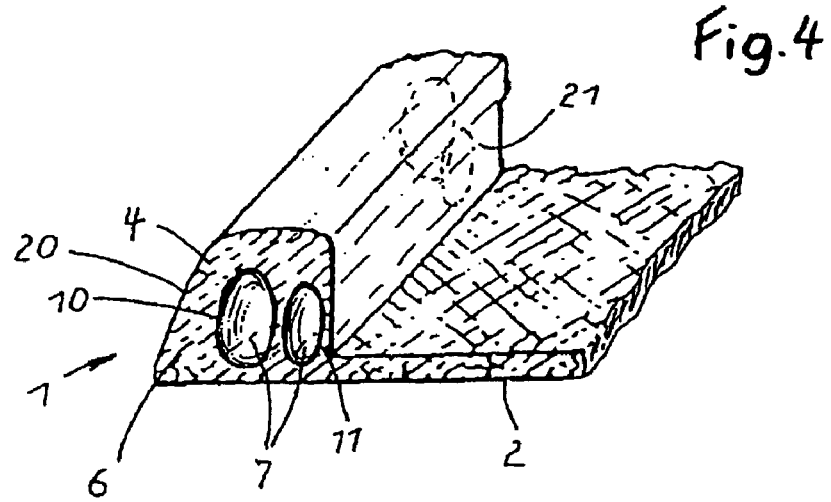
Fig. 4
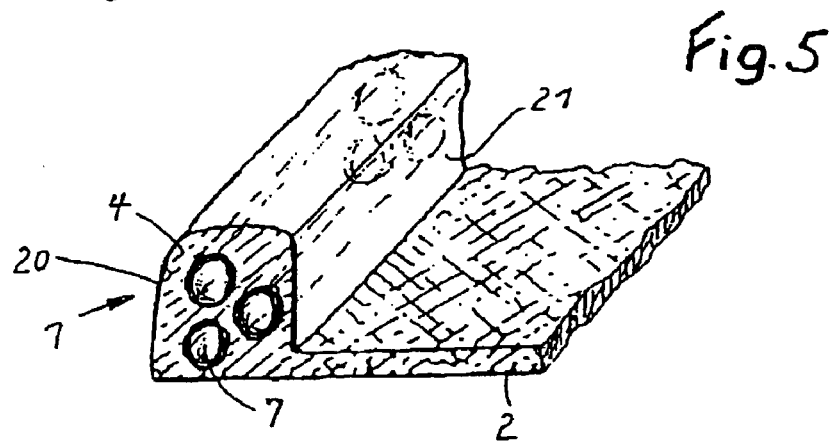
Fig. 5
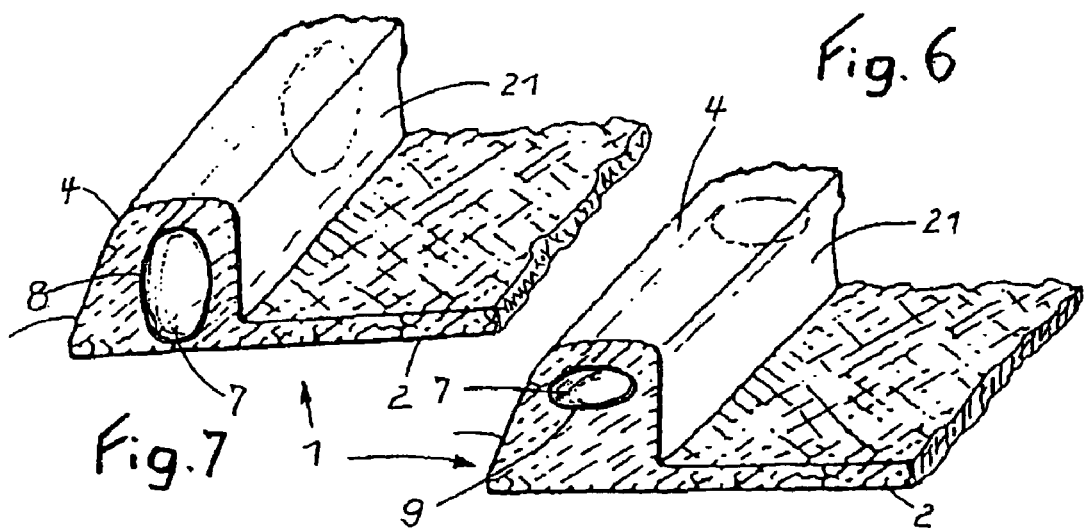
Fig. 6
Fig. 7

HORSESHOE-LIKE HOOF PAD LINING

The invention concerns a horseshoe-like hoof pad lining forming an essentially flat plate comprised of flexible plastic material in order to avoid the adhesion especially of snow and ice at the hoof sole, which can be placed within the space enclosed by the hoof pad between the hoof pad and the hoof sole, which hoof pad lining is provided with a tube-like hump defining at least partly the enclosed space, which hump having at least partly an air-filled hollow space standing upright on the plate of plastic material and extending generally to the upper edge of the hoof pad.

Linings of this type are for instance known from the published German patent application 36 44 706. They have the purpose to avoid the adhesion of especially snow and ice between the two legs of the hoof pad and the hoof surface because those adhesions do not only have negative effects on the safety of steps of the animal provided with horse shoes, but do also increase the danger of injury.

The said disadvantages are not or not completely, respectively, overcome by the known hoof pad linings, although they already take advantage of the known idea to provide the flat lining of flexible material, for instance of plastic material with a tube-like hump, having at least partly an air filled hollow space so that the hump can be elastically deformed causing a resilient force on stepping of the hoof or the hoof pad, respectively, on a solid ground covered especially with snow and ice, which resilient force is if the pad is unloaded therefore the reason that the material included between the legs of the pad will be thrown out.

The fact that the known hoof pad linings are not successfully working on avoiding the adhesion of strange material at the pad surface between the pad legs has also the reason that it was not known that the elastic capacity of the hump has to be adapted to the step of the hoof on the ground.

As surely known, the animal, for instance a horse, is stepping forward on the ground in a special manner according to which at first the front end of the hoof pad touches the ground. Thereafter the weight of the horse is then continuously shifted to the back so that the backward following parts of the surface of the pad touch the ground. This rolling of the pad results therein that at first the greatest part of the weight of the horse causes at the tip of the pad with respect to the ground a pressure force dependent on the weight so that the continuous hump is so strongly loaded that its useful life-time is relatively short dependent on the materials used for the pad lining. Thus, the hump will be extremely abraised and therefore its backward parts positioned at both legs of the pad opposite to one another loose their resilient throw-out function.

Therefore, the object underlying the invention is to avoid these disadvantages and especially to essentially improve the function and thus life-time of such kind of hoof pad linings.

In order to solve this object the invention proposes that the hump forms a tube-like hollow space profile provided with at least one oval hollow space and extending up to a connecting bridge connecting the two legs of the hoof pad in the range of their ends, which hump is provided at the front end of the hoof pad in the range of the connecting point of the two legs with an interruption, wherein the plastic material of the hoof pad and the hoof is free of a hump following the circumference of the hoof pad and beyond the connecting bridge in the direction of the ends of the legs.

The tube-like hollow space profile avoids because of its cross-section configuration and its extension at the inner edge of the hoof pad provided with interruptions in the front and back area of the hoof especially the formation of clods of snow and ice on the hoof surface. The reason therefore is the elastic characteristics of the plate of plastic material as well as also the arrangement of the connecting bridge at the end of the hoof pad developing a spring tension upright to the hoof surface causing a certain amount of play if the hoof touches the ground, which play is counteracting the fixing of snow and/or ice.

Thus, the proposal according to the subject of the invention is a good combination of constructional features concerning hoof pad linings and hoof pads theirselves resulting in advantageous cleaning effects and, respectively, cleanness effects.

Advantageous embodiments of the invention are characterized by the claims appended hereto.

The invention will be described in detail in the following related to the embodiments as shown by the drawings.

Figure 2:
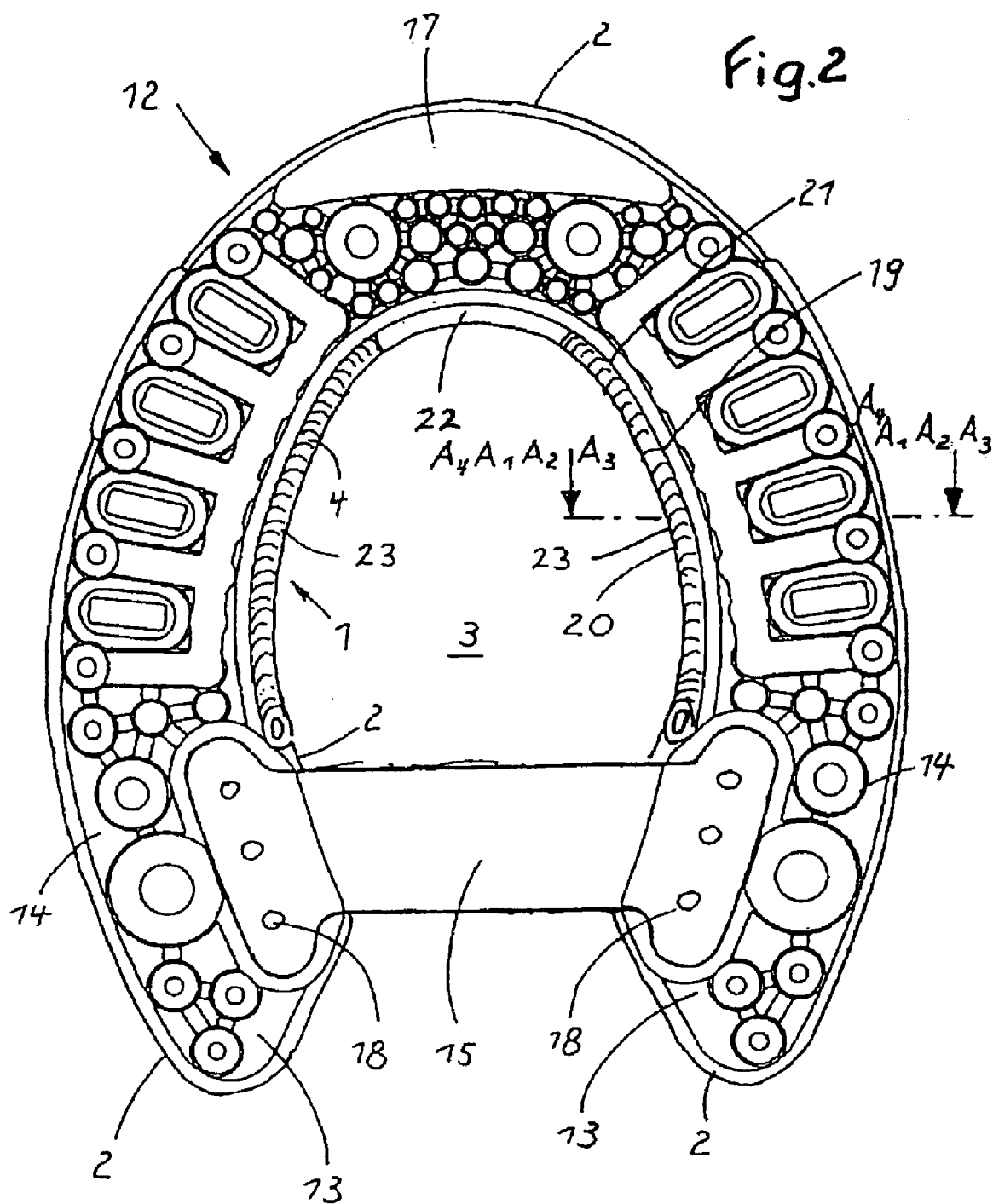
Figure 3:
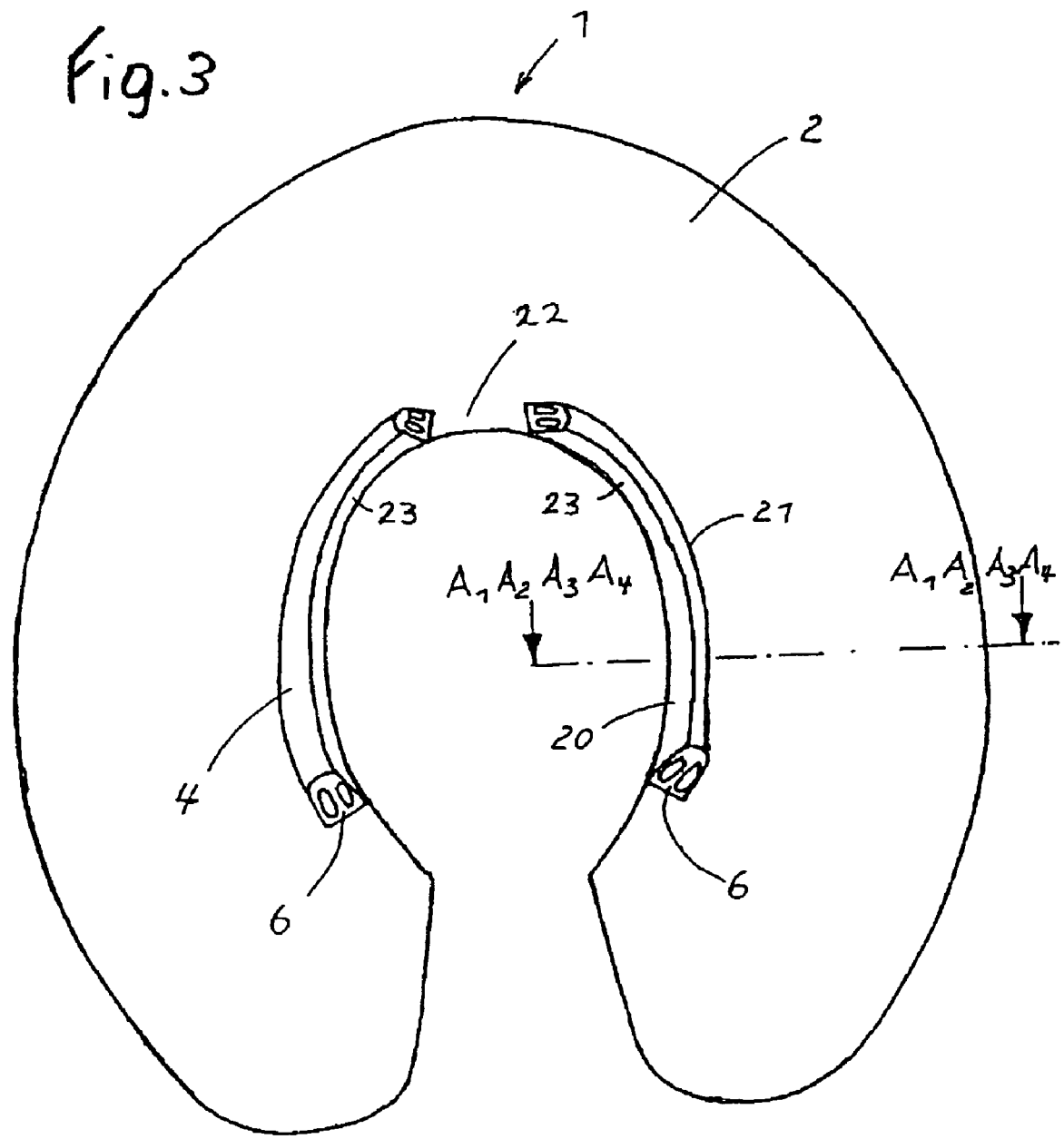

In the drawings are:

FIG. 1 a plan view of the hoof pad comprised of plastic material provided with a connecting bridge without a pad lining;

FIG. 2 a plan view of the plastic hoof pad in accordance with FIG. 1, provided with hoof pad lining and connecting bridge, FIG. 3 a plan view of an embodiment of the hoof pad lining in a scale in accordance with FIGS. 1 and 2, FIG. 4 a partial cross-sectional view of the hoof pad lining along the line A1—A1 in FIG. 3, in a larger scale, FIG. 5 a partial cross-sectional view of another embodiment of the hoof pad lining along the line A2—A2 in FIG. 3, in a larger scale, FIG. 6 a partial cross-sectional view of a further embodiment of the hoof pad lining along the line A4—A4 in FIG. 3, in a larger scale, FIG. 7 a partial cross-sectional view of a still further embodiment of the hoof pad lining along the line A3—A3 in FIG. 3, in a larger scale.

The hoof pad 12 of plastic material as shown in FIG. 1 is provided in a manner known per se with legs 14 surrounding as an elevated body the hoof surface 3. The legs are provided in the area of their lower ends 13 with recesses 16 for the reception of the bridge-like connecting bar 15, joining both ends 13. This connecting bar can be fixed in a manner known per se to the legs 14 for instance by means of screws 18.

The surface of the hoof pad is with the exception of the front pad end 17 provided with a profile, in order to improve the stepping safety of the hoof if the hoof is stepping forward and thus to reduce the danger of slipping.

Between the hoof pad 12 and the hoof a horseshoe-like lining 1 is positioned which is shown in FIG. 3 and which should avoid that especially snow and ice are enclosed between the two legs 14 of the hoof pad 12 on the hoof surface 3 resulting in a detrimental effect concerning the safety of step by step movement of the animal.

The hoof pad lining 1 is configuered as an essential flat plate 2 comprising of flexible plastic material having an outer and an inner circumference adapted to the hoof pad 12 and comprising at its inner circumference a tube-like hump 4 defining the hoof surface 3. The hump 4 is provided with a tube-like hollow space profile 6 having different configurations as shown in FIGS. 4 to 7 and extending generally up to the upper edge of the hoof pad.

This tube-like hollow space profile 6 forms at least one oval hollow space 7 as shown in FIGS. 6 and 7, forming in these embodiments a lying or standing ellipse in order to improve the elasticity of the hollow space profile 6 so that the hump or bulge will be elastically deformed if the hoof steps onto a solid ground. This deformation is such that it avoids the occurrence of the accumulation of compact materials, especially solid ice and snow on the hoof surface 3.

The tube-like hump 4 extends, as shown in FIG. 2, up to the connecting bar 15, and turns with the two legs 14 of the hoof pad 12 in the area of their ends 13. Moreover, this hump 4 is provided at the front end 17 of the hoof pad 12 in the area of the joining point of the two legs with an interruption 22, as shown in FIGS. 2 and 3, so as to form separated portions 23. Beyond the connecting bar 15 and in the direction of the ends 13 of the legs, however, the plastic plate 2 of the pad lining, which is fixed together with the hoof pad 12 on the hoof in a manner known per se, is free of any hump 4. By this defined configuration of the hump 4 the requested strong seat of the connecting bar 15 within the recesses 16 is gained and moreover it is avoided that the ends of the hump 4 will be too strongly deformed if the hoof steps onto the ground.

The hollow space profile 6 is continuously configured with the only exception of the interruption 22 at the front end 17 of the hoof pad 12.

Instead of a single ellipse 8, 9 as shown in FIGS. 6 and 7, it is also possible to use several, especially parallel ellipses 10, 11 as shown in FIG. 4. On upright arrangement of the ellipses, as shown in FIG. 7 for example, their smaller axis extends generally parallel to the hoof sole, whereas on lying or non-upright arrangement as shown in FIG. 6, the large axis of the ellipse extends generally parallel to the hoof sole.

The size of the cross section of the space 7 of the hollow space profile 6 is advantageously ⅓ to ½ of the whole cross section of the hump and the two lower ends of the hump 4 positioned adjacent to the connecting bar 15, are, as shown in FIG. 2 cut in such a manner that the oval hollow space 7 is open.

As shown in FIG. 5, the configuration of the hollow space 7 of the hollow space profile need not be a special form of an ellipse and also need not have a special number of those hollow spaces, but is adapted to the conditions of elasticity requested for the hump 4 dependant on the material of the pad. In this connection the cross section of the hump is advantageously configured such that the inner edge 19 of the hoof pad 12 is intensively touched by the opposing wall 21 of the hump, whereas the outer wall 20 of the hump adjacent to the surface 3 of the hoof extends either as the inner wall 21 essentially vertically to the plastic material plate 2, as shown in FIG. 5, or is inclined to the latter one, as shown in FIGS. 4, 6 and 7.

The invention claimed is:

1. A lining usable with a horseshoe comprising a hoof pad defining a periphery and a pair of legs, said pad being adaptable to a sole of a hoof and having a connecting bar that is usable to connect said pair of legs substantially near ends of the legs, said lining comprising:
   a flat plate defining a periphery and comprising a flexible material, said plate being positionable within a space definable by said hoof pad and said sole of said hoof so as to avoid adhesion of snow and ice on said sole of said hoof, the plate also being substantially similar in shape to that of said hoof pad; and
   a tubular shaped hump positioned along and extending from said periphery of said flat plate and being formed of separate portions, the hump including at least one substantially tubular hollow space and further defining said space definable by said hoof pad and said sole of the hoof, the separate portions each having one end that extends substantially to the connecting bar and a second end, said plate being free of said hump beyond a point of connection of said legs by said connecting bar and the second end of each separate portion having an end wall that extends from the flat plate with the flat plate extending between the end walls such that a gap is provided between the end walls substantially adjacent connection of said legs of said hoof pad.

2. The lining as recited in claim 1 wherein:
said at least one substantially tubular hollow space comprises a profile which is similarly configured throughout said separated portions of said hump.

3. The lining as recited in claim 1 wherein:
said at least one substantially tubular hollow space forms at least one ellipse.

4. The lining as recited in claim 3 wherein:
the at least one ellipse is adapted to be positioned in an upright stance relative to said sole of said hoof such that the smaller axis thereof extends generally parallel to said sole of said hoof and the larger axis thereof extends generally parallel to the height of the hump.

5. The lining as recited in claim 3 wherein:
the at least one ellipse is adapted to be positioned such that the larger axis thereof extends generally parallel to the sole of said hoof and the smaller axis thereof extends generally parallel to the height of the hump.

6. The lining as recited in claim 1 wherein:
the cross-sectional size of the at least one substantially tubular hollow space ranges from ⅓ to ½ that of the total cross-sectional size of the hump.

7. The lining as recited in claim 1 wherein:
the at least one substantially tubular hollow space is positioned in an upper half of a cross-section of the hump.

8. The lining as recited in claim 1 wherein:
the at least one substantially tubular hollow space comprises two separated ellipses oriented vertically so as to be positioned parallel to each other and perpendicular to the sole of said hoof.

9. The lining as recited in claim 8 wherein:
the ellipses are each of the same size.

10. The lining as recited in claim 1 wherein:
the at least one substantially tubular hollow space comprises two separated ellipses oriented horizontally so as to be positioned parallel to each other and to the sole of said hoof.

11. The lining as recited in claim 10 wherein:
the ellipses are each of the same size.

12. The lining as recited in claim 1 wherein:
the at least one substantially tubular hollow space undergoes an elastic deformation upon load being placed thereon.

13. The lining as recited in claim 1 wherein:
the ends of said at least one substantially tubular hollow space are open.

* * * * *